July 9, 1963 W. F. SKILLIN 3,096,988
COMPENSATING POWER CHUCK
Filed Sept. 30, 1960 2 Sheets-Sheet 2

INVENTOR
*Walter F. Skillin*
BY
*Roy C. Hopgood*
ATTORNEY

United States Patent Office 3,096,988
Patented July 9, 1963

3,096,988
COMPENSATING POWER CHUCK
Walter F. Skillin, New Britain, Conn., assignor, by mesne assignments, to The Cushman Chuck Company, Hartford, Conn., a corporation of Connecticut
Filed Sept. 30, 1960, Ser. No. 59,573
4 Claims. (Cl. 279—4)

This invention relates to a power chuck and, more particularly, to an arrangement for operating each jaw of the chuck independently.

In some chucks, the jaws are moved in synchronism by a common control element. While such an arrangement ensures the same radial displacement of each jaw when one is actuated, it prevents the jaws from properly gripping objects having uneven surfaces.

Moreover, the jaws in many chucks are difficult to remove. Consequently, the guides or ways in which the jaws move become worn and, thus, impair the accuracy with which the jaws may be adjusted.

Accordingly, it is an object of the invention to provide a new and improved chuck in which the jaws are controlled to enable them to set on the work independently of each other.

Another object of the invention is to provide a chuck in which the jaws are controlled independently from a common power source through separate driving units.

Still another object of the invention is to provide a chuck having jaws which are normally adjustable radially for internal or external gripping and which are removable from the chuck body readily.

Other objects and various features of novelty of the invention will be pointed out hereinafter and will become apparent to those skilled in the art from a reading of the following detailed description of a preferred form of the invention, taken in conjunction with the accompanying drawings, in which.

Figure 1:
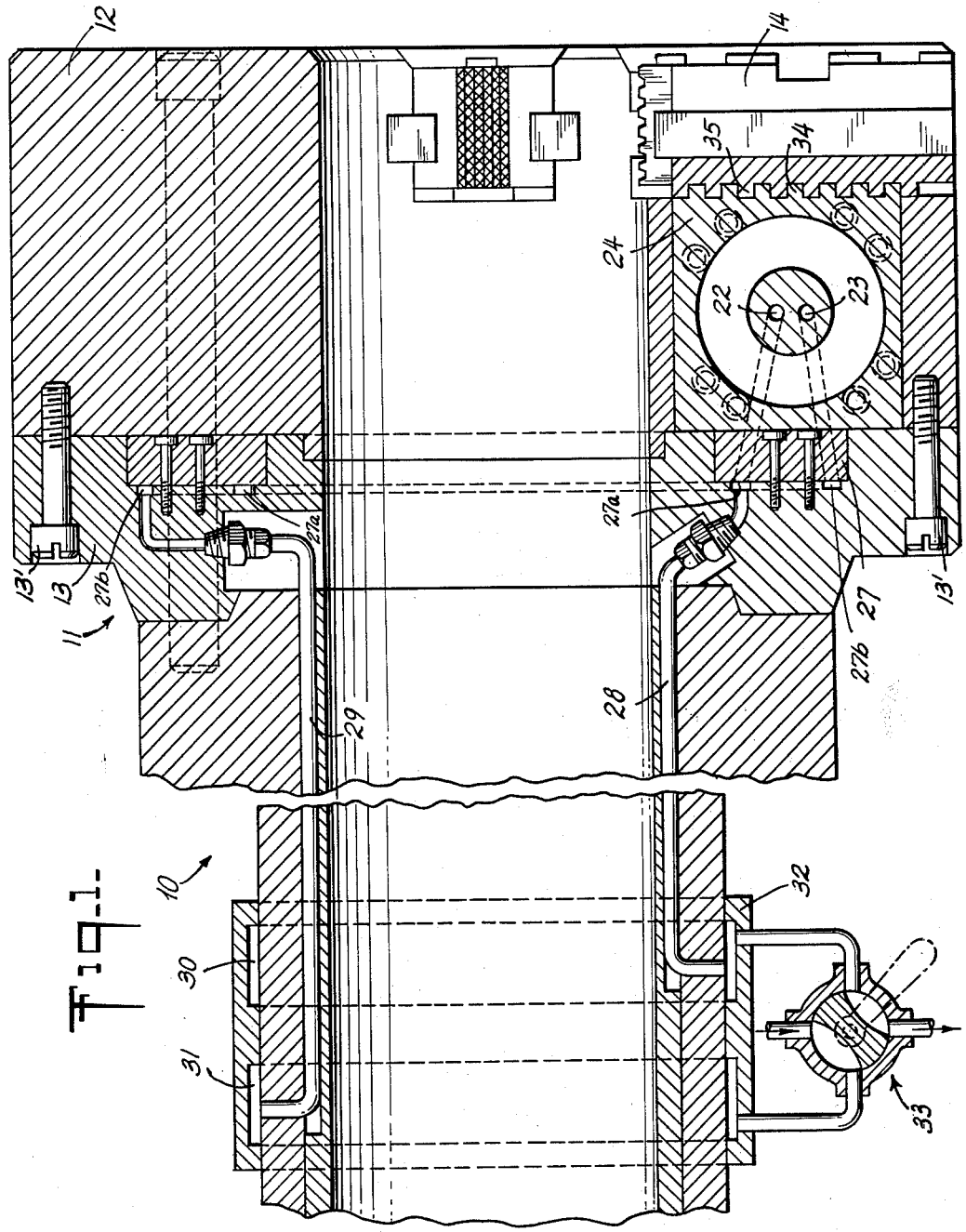
FIG. 1 is a central sectional view of a chuck and a spindle in accordance with the invention.

Referring now to the form of the invention shown in FIG. 1, a spindle 10 of a machine, such as for example a lathe, supports a chuck body 11 consisting of a forward or main section 12 and a rear section 13. The two sections 12 and 13 are attached together by a plurality of screws 13', or the like.

Figure 2:
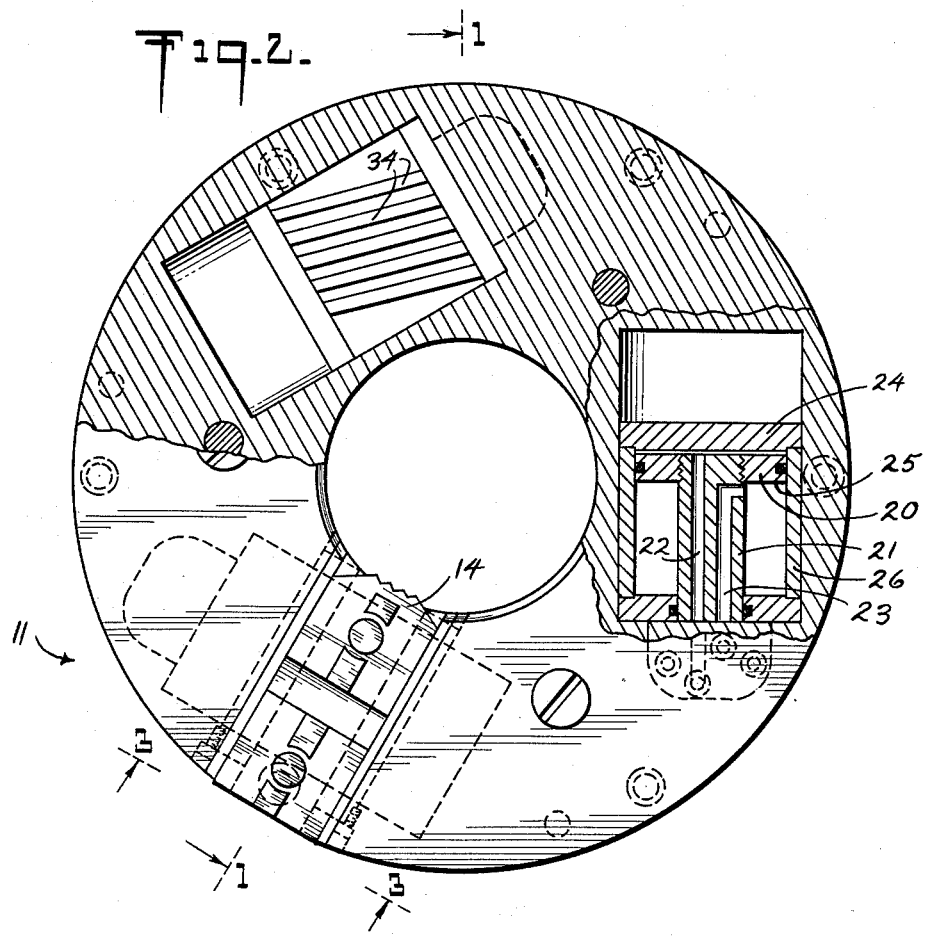
FIG. 2 is a front view of the chuck illustrated in FIG. 1, parts being broken away on several planes to show the internal construction.
Figure 3:
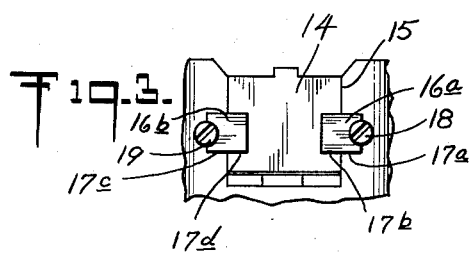
FIG. 3 is a fragmentary, radial view showing one jaw of the chuck and showing removable guide means for guiding the jaw in a radial sliding movement in the chuck body.

As best seen in FIG. 2, the chuck 11 has three radially slidable jaws 14 spaced equally about the chuck 11 (only one jaw 14 being visible in FIG. 2, the other two jaws being broken away to reveal the structure underneath). As shown more particularly in FIG. 3, each jaw 14 fits within a guideway 15, and each of the jaws 14 has integral guides 16a and 16b on opposite sides thereof.

When wear takes place, the chuck jaws 14 become loose and, therefore, lose the accurate fit originally provided. Therefore, the guides 16a and 16b are removable radially and, in the form shown, are substantially square in cross section to seat accurately in oppositely faced slots 17a—17b and 17c—17d in the sides of the jaw 14 and the guideway 15, respectively. The walls bounding slots 17a—17b and 17c—17d form the axially outer and inner radial abutment surfaces. Thus, a sliding fit is provided between the guides 16a—b and the chuck jaw 14 so that when wear causes looseness, it is only necessary to replace the guides 16a—b.

The guides 16a—b are held in position by screws 18 and 19 which may be threaded into the chuck body section 12 and into the guides 16. Therefore, when it is desired to remove a chuck jaw 14 and/or the guides 16a—b, the screws 18 and 19 are removed, and the guides 16a—b are forced out in a radial direction.

However, each jaw 14 coacts with an operating mechanism which prevents its removal in a radial direction. Therefore, each jaw 14 is removable in an axial direction by first removing the guides 16a and 16b. The chuck jaw 14 then is lifted out in a direction axially of the chuck body 11.

The jaws 14 are operated by motor means carried by the chuck itself, and each jaw is provided with a separate motor means. The motor or operating mechanism includes a piston 20 carried by a piston rod 21. This rod has passages 22 and 23 extending longitudinally therein for the passage of fluid to the head end 24 or the tail end 25 of the piston, respectively.

The piston 20 fits in a cylinder 26 so that, upon the application of pressure to one end 24 or the other end 25 of the piston 20, the cylinder 26 is moved back and forth; the cylinder for each jaw is thus double-acting. The axis of the piston 20 and cylinder 26 extend at substantially angles to the radial line of the chuck 11.

While any suitable control arrangement may be provided to operate each jaw 14 separately, in FIG. 1 it is shown for one jaw 14 only that the passages 22 and 23 are connected through an annular block 27 (via annular manifolds 27a—27b) to two fluid pressure control pipes 28 and 29, respectively, which connects fluid pressure from annular channels 30 and 31, respectively, to operate all jaws in the manner specifically shown for the one jaw 14. These channels 30 and 31 are formed in a collar 32 fitting about the spindle 10 at an appropriate location on the machine. The single control means 33 thus serves all jaws in common, regardless of the shape or position of the work being chucked.

A fourway valve 33 is connected to direct fluid pressure either to control pipe 28 to extend the jaws, as at 14 or to control pipe 29 to retract the jaws. Of course, when fluid pressure is applied to one of the control pipes 28 or 29, the fluid pressure is relieved from the other control pipe by the same valve 33.

As illustrated in FIG. 2 and as described in detail in Patent No. 2,779,601, the upper surface of the cylinder 24 is provided with transversely inclined teeth 34 for engagement with correspondingly inclined teeth 35, FIG. 1, on the bottom of the chuck jaws. Thus, when a cylinder 24 is reciprocated, the associated jaw 14 is moved radially in and out.

As decribed previously, each jaw 14 is provided with an independently operated actuating means. It will be understood that "independently" is used in the sense that each jaw can be moved the same radial distance as the others or an amount more or less than the others, depending upon the contour of the work, thereby permitting the jaws to grip an object having uneven surfaces.

The following claims are intended to define the valid scope of this invention over the prior art and to cover all changes and modifications falling within the true spirit and scope of the invention.

What is claimed is:

1. A chuck, comprising a chuck body, a plurality of chuck jaws, said body having openings to receive each of said jaws, a pair of guide ribs acting between said chuck body and each of said jaws for guiding each of said jaws for radial reciprocation in said body, separate fluid-pressure operated actuating means for radially reciprocating each of said jaws independently, means to connect a source of fluid pressure in common to said actuating means, said body having a pair of oppositely facing radial slots including axially top and bottom abutment surfaces for said ribs to hold them against axial movement but to permit radial movement, and means for removably holding said guide ribs in place in a radial direction.

2. A chuck, comprising a chuck body, a plurality of chuck jaws spaced apart radially about said chuck body and movable radially of the body, removable guide ribs to guide each of said jaws during a radial movement, means for removably holding said guide ribs in place during radial withdrawal, and means to actuate said jaws separately of each other including double acting fluid-pressure-operated drive motor means for moving said jaws, the number of motors being equal to the number of jaws and means to independently control each of said motor means, said last-defined means including a single adjustably controlled source of pressure fluid and a common connection between said jaw motor means and said controlled source.

3. A chuck, comprising a chuck body, a plurality of chuck jaws spaced apart radially about said chuck body and movable radially of the body, removable guide ribs to guide each of said jaws during a radial movement, means for removably holding said guide ribs in place during radial withdrawal, and means to actuate said jaws separately of each other including fluid-pressure-operated drive motor means for moving said jaws, the number of motors being equal to the number of jaws and means to independently control each of said motor means, said means including a single adjustably controlled source of pressure fluid and a common connection between said jaw motor means and said source, whereby said jaws may move different distances, thereby permitting the jaws to grip an object having uneven surfaces.

4. A chuck, comprising a chuck body, a plurality of chuck jaws spaced apart radially about said chuck body and movable radially of the body, removable guide ribs to guide each of said jaws during a radial movement, means for removably holding said guide ribs in place during radial withdrawal, and means to actuate said jaws separately of each other including separate double acting fluid-pressure-operated drive motor means for moving each of said jaws, a single adjustably controlled pressure-fluid source and a common connection between all said motor means and said source, whereby said jaws may move different distances, thereby permitting the jaws to grip an object having uneven surfaces.

References Cited in the file of this patent
UNITED STATES PATENTS

| | | |
|---|---|---|
| 2,777,704 | Sloan | Jan. 15, 1951 |
| 2,779,601 | Skillin | Jan. 29, 1957 |
| 2,948,540 | Garberding | Aug. 9, 1960 |
| 2,985,455 | Powell | May 23, 1961 |